H. E. THOMAS.
RULER FOR MEASURING AND DRAWING.

No. 304,245. Patented Aug. 26, 1884.

Witnesses:
Wm Conard
Frank B. Marlow

Inventor:
Henry E. Thomas,
By H. F. Page
Attorney.

UNITED STATES PATENT OFFICE.

HENRY ED THOMAS, OF SAN FRANCISCO, CALIFORNIA, ASSIGNOR OF ONE-HALF TO JACOB C. SHRADER, OF SAME PLACE.

RULER FOR MEASURING AND DRAWING.

SPECIFICATION forming part of Letters Patent No. 304,245, dated August 26, 1884.

Application filed July 22, 1884. (No model.)

*To all whom it may concern:*

Be it known that I, HENRY ED THOMAS, of the city and county of San Francisco, State of California, have invented certain Improvements in Rulers for Measuring and Drawing Parallel and Right-Angle Lines, of which the following is a specification.

My invention relates to a transparent ruler graduated on its edge and provided with transverse and longitudinal lines across its body, whereby parallel lines of any given length can be drawn at any given distance from each other, not exceeding the width of the ruler. The ruler is also provided with a semicircular protractor, whereby straight lines can be produced at any required angle to a given line, all as hereinafter described.

Figure 1:
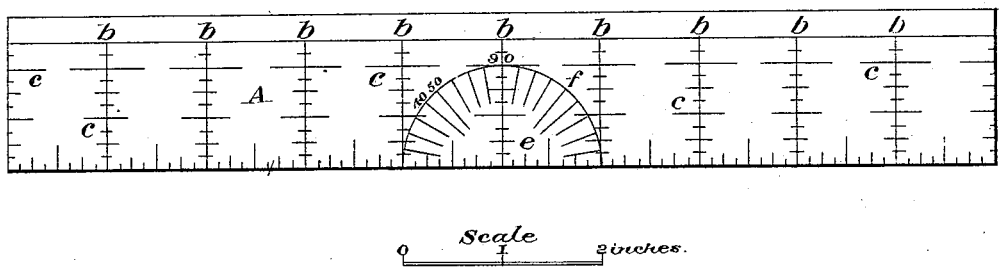
Figure 2:

In the accompanying drawings, Figure 1 is a plan view of the ruler, and Fig. 2 is a cross-section at any line in its length.

A represents a ruler, made of glass or other transparent substance. One or both edges of this ruler I mark with a graduated scale in the ordinary manner, so that lines of any given width can be drawn. Across the ruler, at equal distances, are straight lines $b$, which can be made by extending the inch-marks of the edge scale across the ruler, thus dividing the ruler into as many parts as there are transverse lines. Each transverse line $b$ forms a basis for a separate graduated scale across the width of the ruler. This latter scale is formed by making short lines $c$ across the lines $b$ and parallel with the edge of the ruler. These lines are also graduated so that the marks indicating the inch and the marks indicating the fractions of an inch are easily distinguishable by their length, in the usual way. The object of these lines is to enable me to make lines parallel with the edge of the ruler and at given distances apart by moving the ruler over a line that has been already drawn until the cross-lines, which indicate its distance from the next line, correspond with it. Another line is then drawn by the edge of the ruler, thus forming the two lines at the required distance apart. The transverse lines $b$ aid in determining the relative position and distance apart of the terminals of the two lines—that is, if the line already drawn is only one inch in length, and it is desired to make another line of equal length parallel with it, but one inch in advance of it and one inch to the right of it, the cross-lines $c$ determine the distance apart of the planes of the two lines, while the transverse lines $b$ determine the relative position of their terminals.

At some point in the length of the ruler, and preferably at its middle, I make a semicircle, $e$, and this semicircle I mark off with radial lines $f$, each of which, if extended, would produce a different angle to the line indicated by the edge of the ruler. The figures indicating the degree of each angle can also be indicated opposite each radial line. By means of this protractor, combined with the edge scale of the ruler, I am able to produce lines of a given length at any desired angle to another given line. For instance, given a straight line. Now, to produce a line, say, one inch in length, at an angle of twenty degrees to the given line, I place the radial line of the protractor which indicates twenty degrees upon the given straight line. This disposes the straight-edge of the ruler so that it indicates the angle of twenty degrees to the given line. Now, as the edge of the ruler is graduated to a scale, I can produce a line of any desired length at any distance from the given line. This result has never before been produced in a single ruler. It has always required the use of a protractor and ruler separately; but by combining the two in a transparent ruler—that is, the protractor and the edge scale of the ruler—I can lay off work and mark it out at the same time. By this construction I produce a ruler by means of which geometrical figures can be drawn with mathematical precision. The ruler is transparent, so that the lines already drawn can be easily seen through it, while the lines and scale-marks are also distinguishable, so that they can be compared with, adjusted to, and placed upon the lines already drawn.

I am aware that a transparent ruler is not new, and that such rulers have been provided with graduations and scale-marks. I am also familiar with a transparent protractor consisting of a circular plate of some transparent material having divergent marks formed around the circumference thereof; but in order to use this form of protractor efficiently it is necessary to have the diagram laid out first by dots, and afterward to take a straight ruler and make the lines by it, while by my device the dotting is dispensed with and the position is found, and the line drawn by a single application of the ruler. An opaque ruler with a protractor and scale provided with punctures at each point is also known to me; but there again dots must be made, and then the position of the ruler changed and the line drawn.

Having described my own invention, and claiming, broadly, none of the familiar devices I have just enumerated, what I claim to be new and useful, and desire to secure by Letters Patent, is the following:

A graduated transparent glass ruler having longitudinal and transverse division-lines and a semicircular protractor etched or otherwise permanently marked upon it, in the manner and for the purposes hereinbefore described.

HENRY ED THOMAS.

Witnesses:
EDWARD B. JEROME,
CHARLES HARLAN.